US012540469B2

(12) United States Patent
Mazza

(10) Patent No.: US 12,540,469 B2
(45) Date of Patent: Feb. 3, 2026

(54) MODULAR STRUCTURE AND MAKING PROCESS OF SAID MODULAR STRUCTURE

(71) Applicant: ALUESSE SH.P.K., Durrës (AL)

(72) Inventor: Gabriele Mazza, Durazzo (AL)

(73) Assignee: ALUESSE SH.P.K., Durrës (AL)

( * ) Notice: Subject to any disclaimer, the term of this patent is extended or adjusted under 35 U.S.C. 154(b) by 261 days.

(21) Appl. No.: 18/551,957

(22) PCT Filed: Mar. 22, 2022

(86) PCT No.: PCT/IB2022/052609
§ 371 (c)(1),
(2) Date: Sep. 22, 2023

(87) PCT Pub. No.: WO2022/201025
PCT Pub. Date: Sep. 29, 2022

(65) Prior Publication Data
US 2024/0167267 A1 May 23, 2024

(30) Foreign Application Priority Data
Mar. 24, 2021 (IT) .................. 102021000007130

(51) Int. Cl.
E04B 1/58 (2006.01)
E04B 1/38 (2006.01)

(52) U.S. Cl.
CPC ............ *E04B 1/5806* (2013.01); *E04B 1/388* (2023.08); *E04B 2001/389* (2023.08); *E04B 2001/5875* (2013.01)

(58) Field of Classification Search
CPC .. E04B 1/5806; E04B 1/388; E04B 2001/389; E04B 2001/5875; E04B 2001/5881; E04B 1/5831
See application file for complete search history.

(56) References Cited

U.S. PATENT DOCUMENTS 2,928,512 A * 3/1960 Slater .................. F16B 37/045
403/22
4,878,640 A * 11/1989 Fricker ................ E04B 1/4107
248/500

(Continued)

FOREIGN PATENT DOCUMENTS

CN 201386480 Y 1/2010
CN 102518930 A 6/2012

(Continued)

OTHER PUBLICATIONS

The International Search Report and Written Opinion for PCT/IB2022/052609, mailed Jul. 1, 2022.

(Continued)

*Primary Examiner* — Patrick J Maestri
(74) *Attorney, Agent, or Firm* — Vorys, Sater, Seymour and Pease LLP; Anthony P. Venturino; Maryellen Feehery Hank

(57) ABSTRACT

Modular structure including profile defining a prevailing development axis, and having a perimeter wall including a groove both extending parallel to the prevailing development axis, at least two edges delimiting the groove, wherein at least part of one is indented; connection for constraining more than one profile and including at least one connector including a flat body extending along a principal axis, including a first constraint guide to couple with a first constraint device and defining side walls and at least partially indented to block mutual translation between connector and profile along the main axis when the connector is in the groove, an obstruction element detachably constrainable to the body for interacting with the profile to block the connector with respect to the profile. The body includes a second constraint guide for housing at least part of a second (Continued)

Figure 1A:
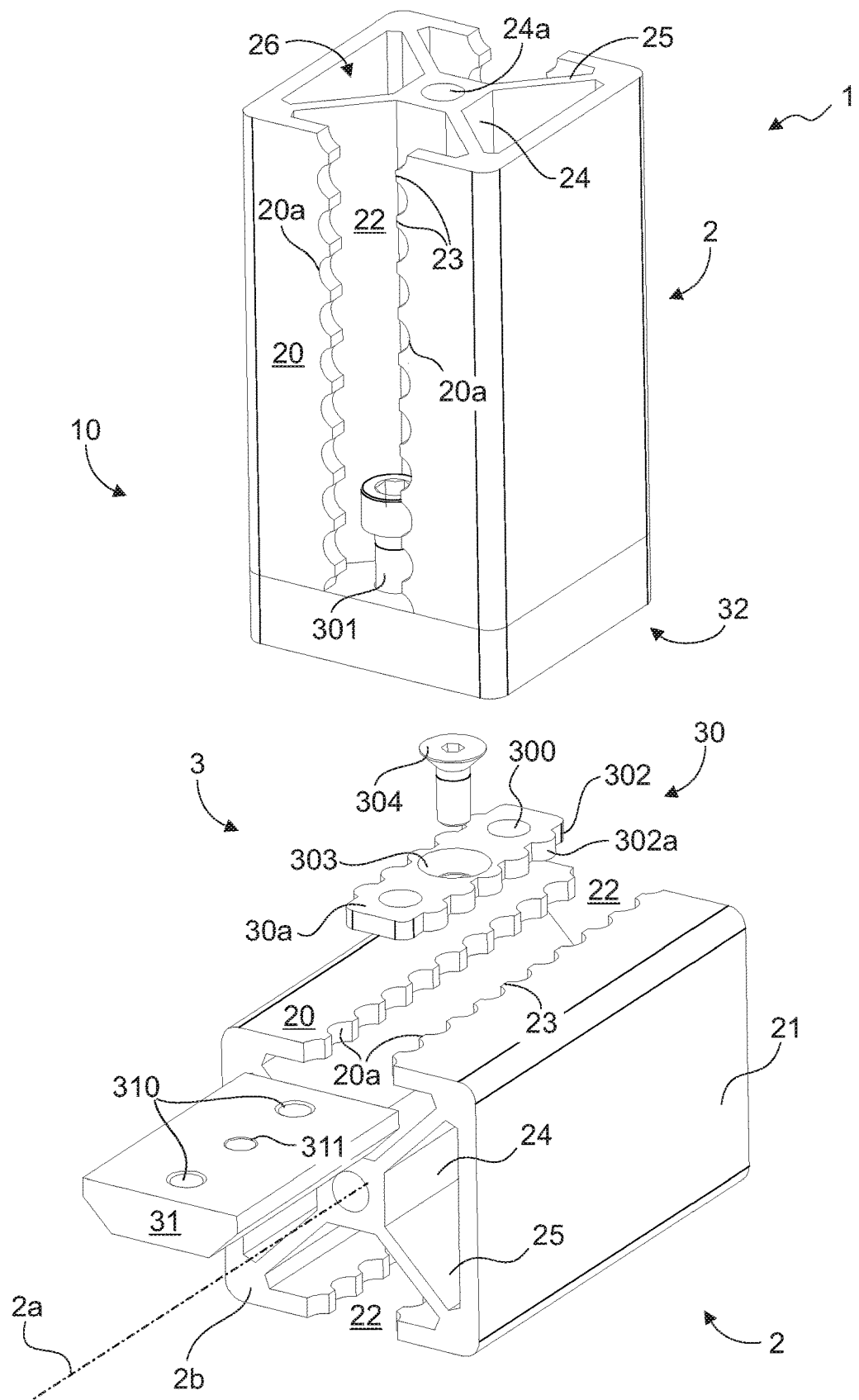

constraint device to constrain the obstruction element and the connector.

15 Claims, 8 Drawing Sheets

(56) References Cited

U.S. PATENT DOCUMENTS

| | | | | |
|---|---|---|---|---|
| 5,171,098 | A * | 12/1992 | Jost | F16B 12/32 |
| | | | | 403/255 |
| 5,746,535 | A * | 5/1998 | Kohler | F16B 37/046 |
| | | | | 403/258 |
| 6,712,543 | B1 * | 3/2004 | Schmalzhofer | F16B 7/187 |
| | | | | 403/258 |
| 7,004,667 | B2 * | 2/2006 | Ludwig | E04B 9/14 |
| | | | | 403/231 |
| 9,797,426 | B2 | 10/2017 | Flaig | |
| 10,415,617 | B2 * | 9/2019 | Chen | E06B 9/04 |
| 11,976,685 | B2 * | 5/2024 | McGrath | F16B 7/187 |
| 2022/0090381 | A1 * | 3/2022 | Lin | E04B 1/388 |

FOREIGN PATENT DOCUMENTS

| | | | |
|---|---|---|---|
| DE | 102008006439 | A1 | 7/2009 |
| EP | 0278252 | A2 | 8/1988 |
| EP | 0716193 | A | 6/1996 |
| EP | 1149957 | A | 10/2001 |
| WO | 2020144523 | A1 | 7/2020 |

OTHER PUBLICATIONS

The Italian Search Report for IT 102021000007130, completed Dec. 3, 2021.

* cited by examiner

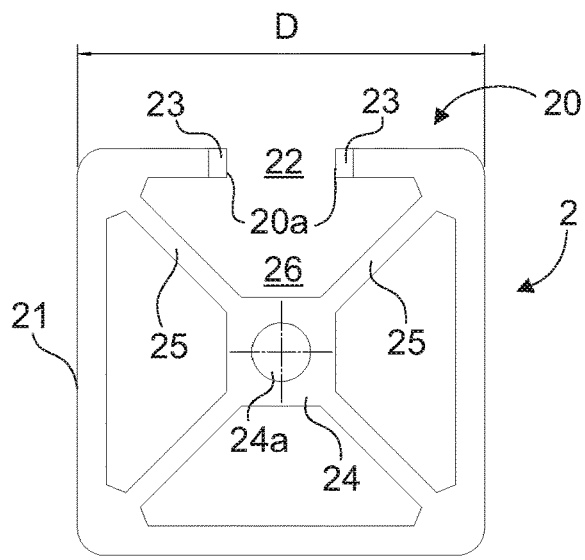
*Fig. 4a*
*Fig. 4b*
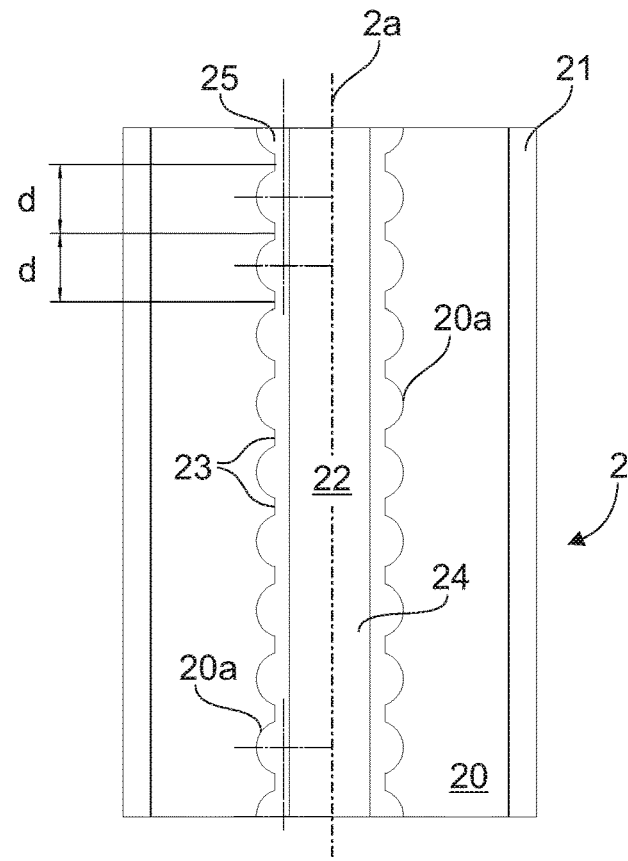
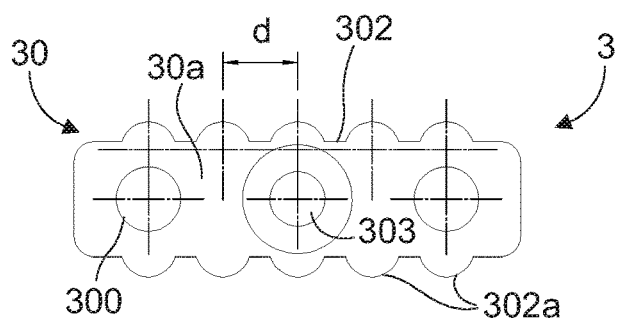
*Fig. 5a*

MODULAR STRUCTURE AND MAKING PROCESS OF SAID MODULAR STRUCTURE

The present invention relates to a modular structure and making process of modular structure of the type specified in the preamble of the first claim.

In particular, the present invention relates to a modular structure, and making process of said modular structure, wherein a plurality of profiles are positioned and constrained in an orderly manner by means of particular connection means.

In addition, the present invention also relates to the profile and the connector which enable the modular structure to be made.

Similar structures and processes are described in patent applications EP-A-0278252 and U.S. Pat. No. 2,928,512.

As is known, modular structures usually include a plurality of profiles, for example extruded profiles, connected to each other by various connection means, for example screws and bolts, in such a way as to make structurally strong frames.

The profiles used are conventionally long-form elements, or rather one dimension predominates over the other two, like a bar, with a profile that can be of any shape. For example, extruded profiles can be simply L or T-shaped or have much more complex shapes.

In addition, profiles of this type can be essentially square in shape, typically describing a square perimeter.

The connectors, on the other hand, are connecting elements generally arranged between adjacent profiles in such a way as to connect them and constrain them rigidly together.

The connectors can be bars, plates or L-connectors that can be bolted to the profiles by means of common screws and nuts, in such a way as to lock the connector to the two adjacent profiles.

Generally, the nuts are housed in cavities formed by the profiles themselves while the screw is positioned from the outside.

Examples of such structures are, for example, described in patent applications U.S. Pat. No. 9,797,426 and DE-A-102008006439.

In addition, other types of extruded profiles with different geometries are also known, for example hexagonal or octagonal, as described in patent applications CN-Y-201386480 and CN-A-102518930, or cross-shaped, for example in patent application EP-A-1149957, which are in each case conventionally connected.

The known technique described comprises some important drawbacks.

In particular, all the modular structures of the known technique require a high amount of attention and time to build the structure as a whole. In fact, all known connection systems provide for the positioning of a nut inside the rail, which remains mobile until the constraint is realised with the aid of a rail or lateral gap.

These connections are therefore particularly uncomfortable when the profiles are arranged perpendicular to the ground, i.e. parallel to the gravitational gradient. It is therefore not unusual for the rails housing the mounting nuts to be arranged parallel to the ground in order to constrain the various profiles together.

In addition, the clamping nuts, which are usually inserted by sliding into the lateral gaps, must be inserted beforehand, since none of the profiles described allows subsequent insertion of the profile itself at the ends, for example with interface portions.

On the other hand, the solutions that envisage more performing connection means have the important drawback of including ad hoc interface elements, depending on the direction and type of joint.

For example, in patent application EP-A-0716193, although the profile allows easier insertion of the nut, by virtue of its cross section in which the arms include T-shaped elements with lateral chamfers, this profile also has the important drawback that, as for the other profiles, the nuts must be inserted beforehand within the section defined by the profile.

Furthermore, also in this case, the interface elements must be modified and manufactured in a different way depending on the type of constraint to be achieved, for example in the case where the interface element is the node of a structure where three or four bars meet, as opposed to a corner node.

In this situation, the technical task at the basis of the present invention is to devise a modular structure and a procedure for realizing said modular structure capable of substantially obviating at least part of the aforementioned drawbacks.

In the context of said technical task, it is an important scope of the invention to obtain a modular structure and making process said modular structure, which allows to facilitate and speed up the connection of the profiles for realizing the structural frame.

It is another important scope of the invention to achieve a modular structure and making process of said modular structure that allows various types of connections to be made with the same interface element.

In addition, another important task of the invention is to realize a modular structure whose connection means allow the connection nuts to be arranged easily and without the need to previously insert the same within the side gaps at one end.

The specified technical task and purposes are achieved by a modular structure and procedure for making said modular structure as claimed in the appended claim 1.

Preferred technical solutions are disclosed in the dependent claims.

Figure 1B:
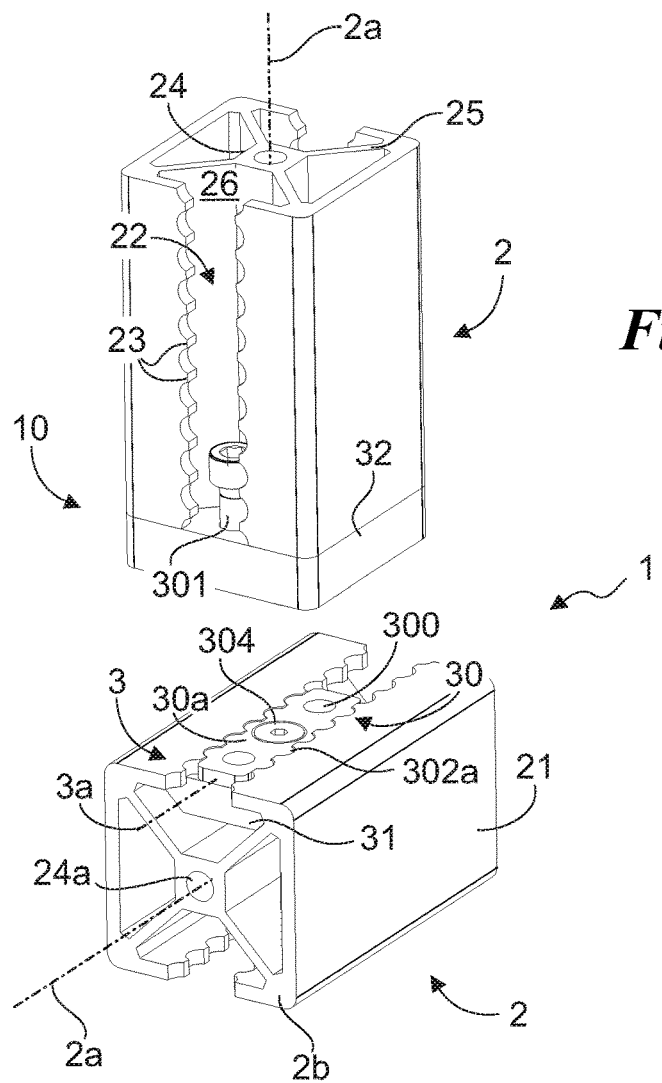
Figure 1C:
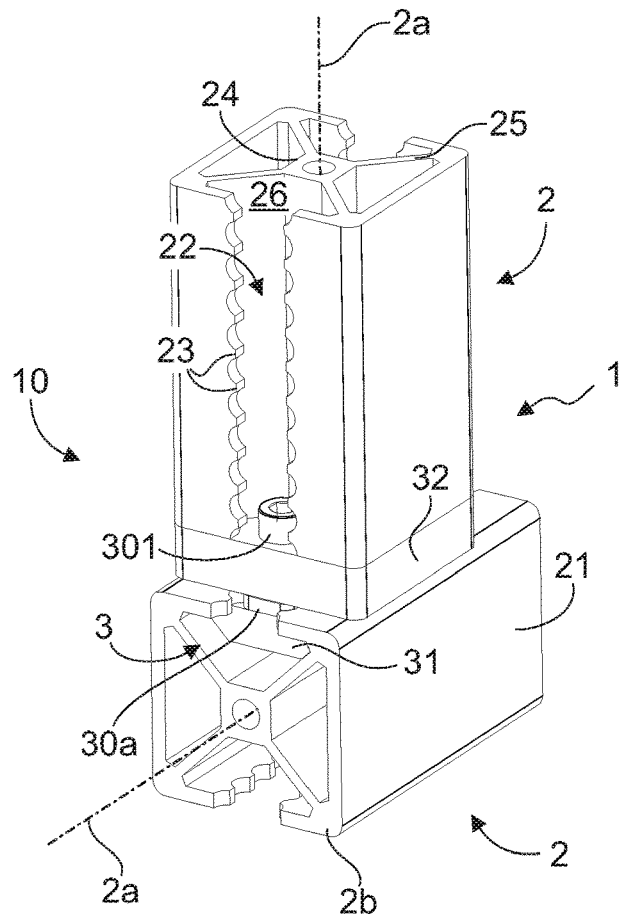
Figure 2:
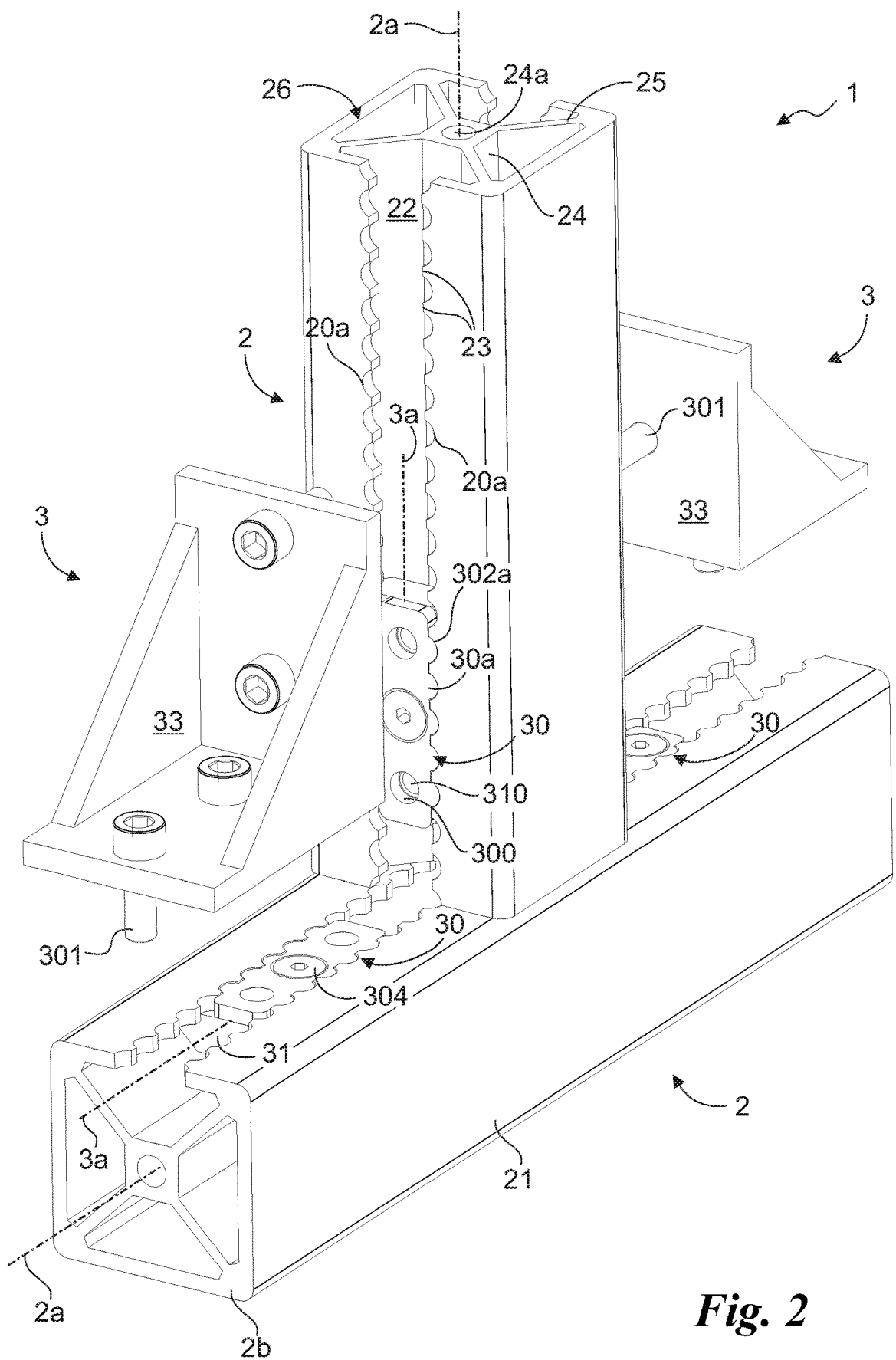
Figure 3:
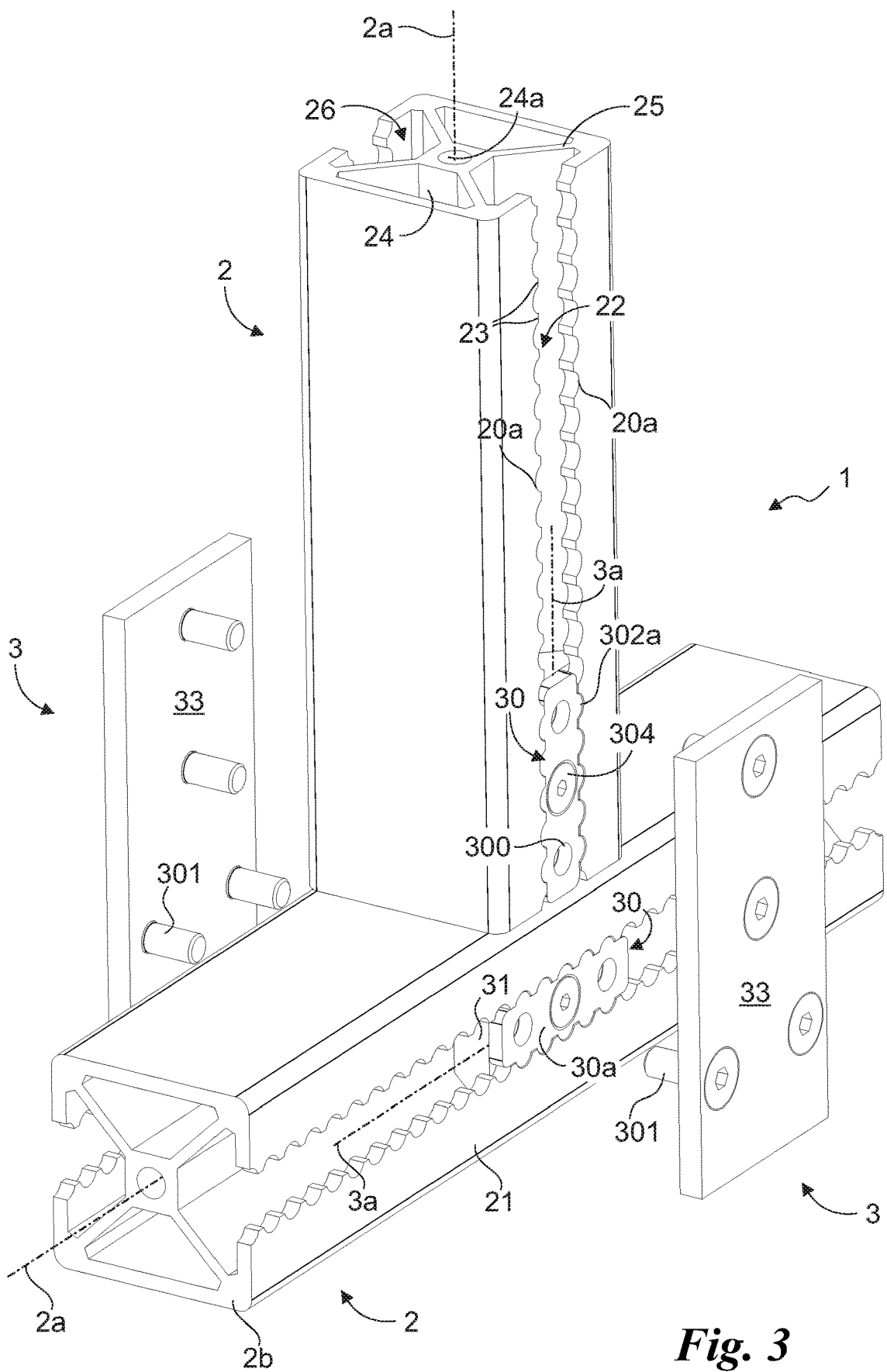
Figure 5B:
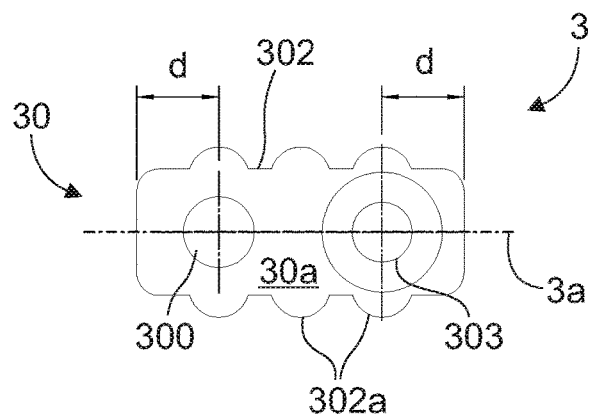
Figure 5C:
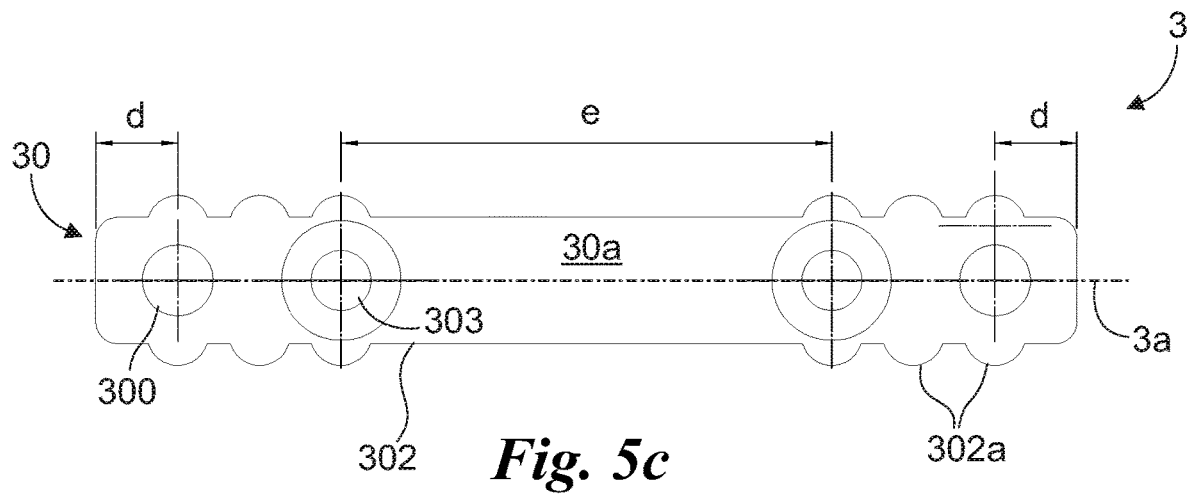
Figure 5D:
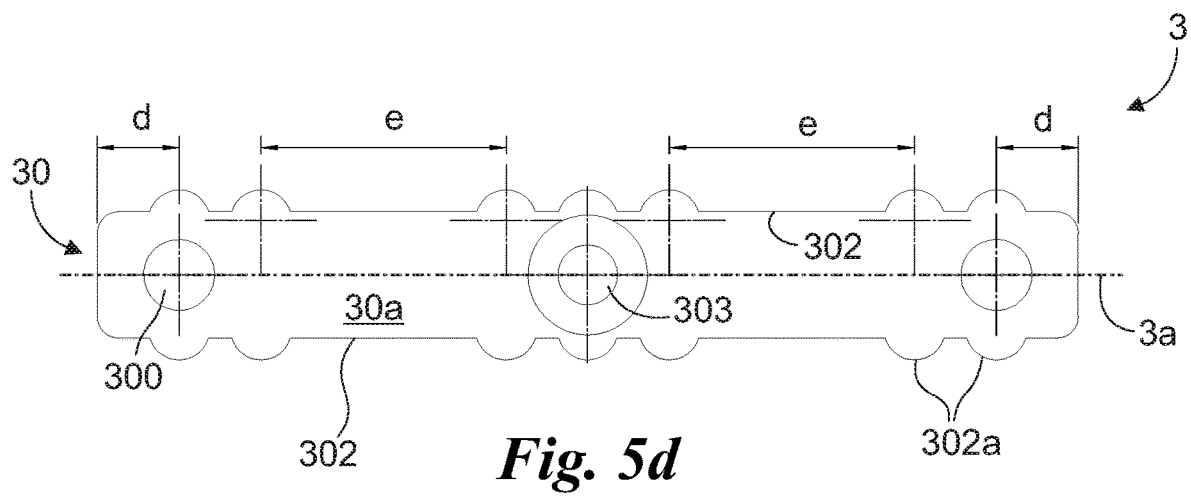
Figure 6A:
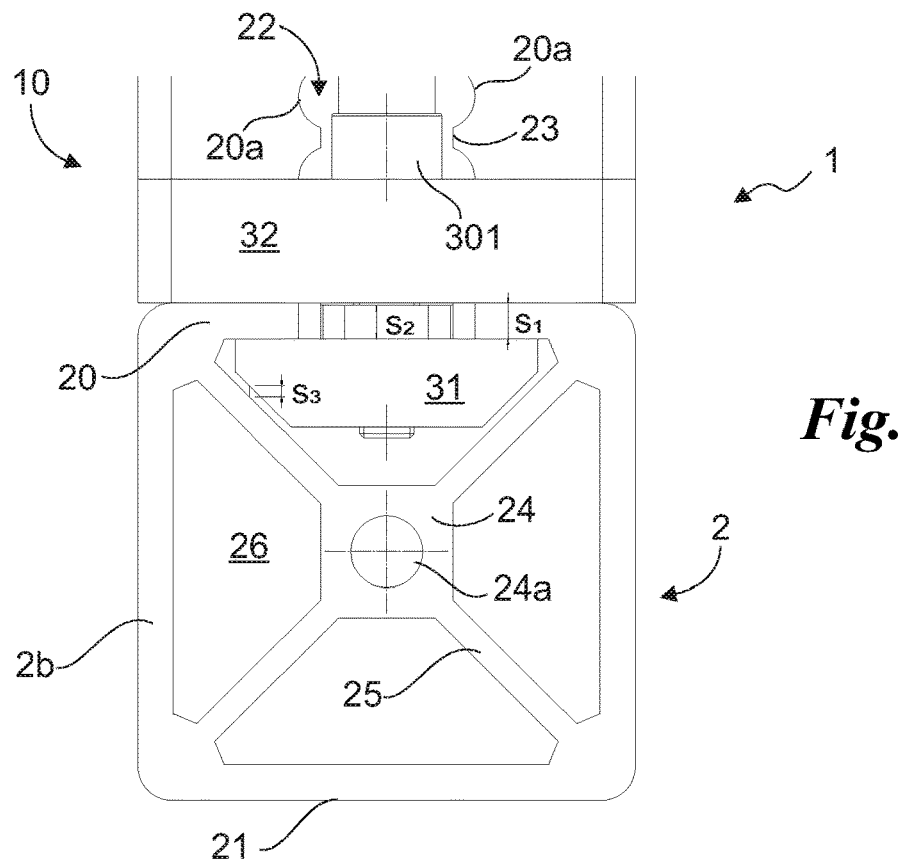
Figure 6B:
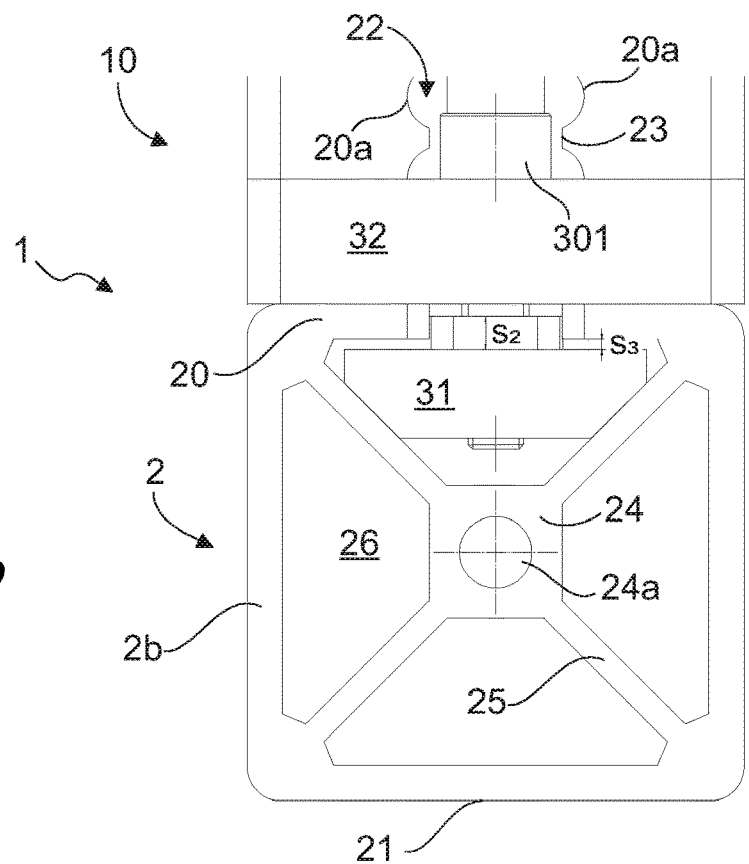
Figure 7:
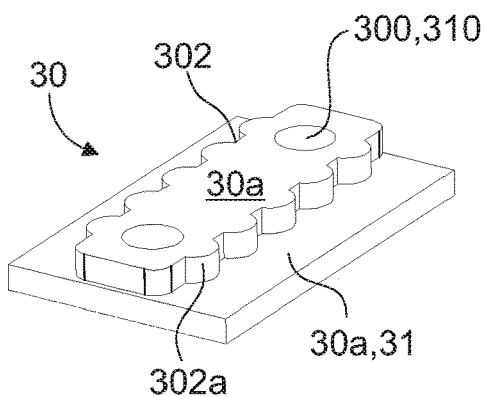
Figure 8A:
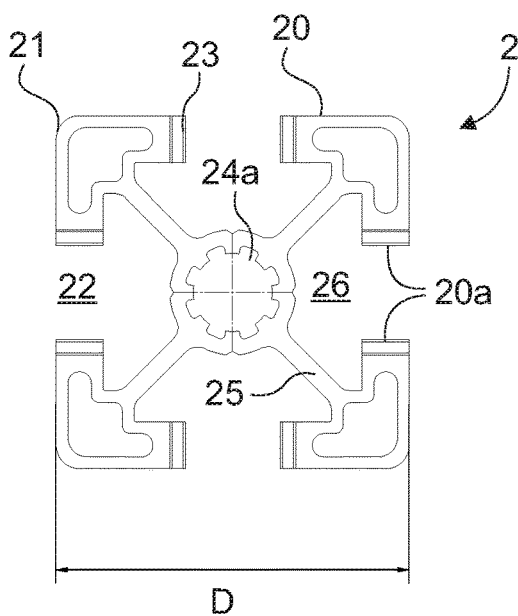
Figure 8B:
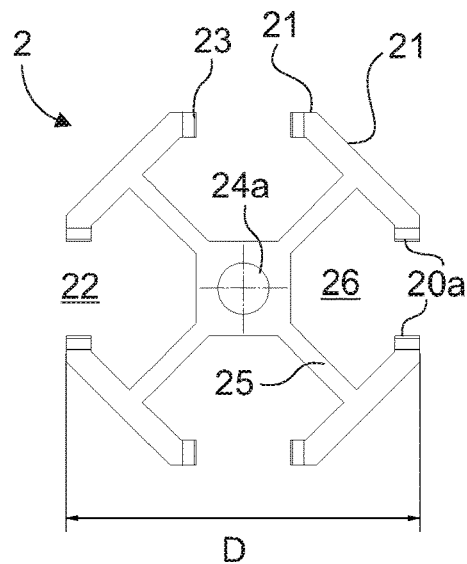
Figure 8C:
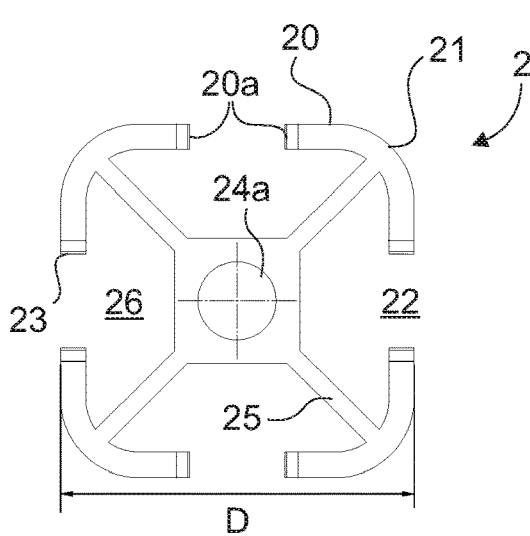

The features and advantages of the invention are hereinafter clarified by the detailed description of preferred embodiments of the invention, with reference to the appended drawings, wherein:

the FIG. 1a shows a perspective view of a modular structure according to the invention in which the connection means include, in a first making example, a connector, an obstruction element and a base during prior assembly of the components;

the FIG. 1b illustrates the example of FIG. 1a in an intermediate step in which the connector is inserted into the groove, the obstruction element is inserted into the housing and the connector and obstruction element are mutually constrained;

the FIG. 1c is an example of FIGS. 1a-1b in a final step in which the connector is coupled to the base of the structural bar formed by the profile and the base;

the FIG. 2 represents a perspective view of a modular structure according to the invention in which the connection means include, in a second making example, various connectors to which respective obstruction elements and two angular connection devices are associated in order to realize an at least partially T-shaped frame;

the FIG. 3 depicts a perspective view of a modular structure according to the invention in which the connection means include, in a third making example, various connectors to which respective obstruction elements are associated and two lateral connection devices to realize an at least partially T-shaped frame;

the FIG. 4a shows a sectional view of a profile according to the invention in which the groove defined by jagged edges is present;

the FIG. 4b illustrates a top view of the profile of FIG. 4a;

the FIG. 5a is a top view of a connector according to the invention, part of the connection means, in a first embodiment in which two first holes and a second hole are present;

the FIG. 5b is a top view of a connector according to the invention, part of the connection means, in a second embodiment wherein a first hole and a second hole are present;

the FIG. 5c illustrates a top view of a connector according to the invention, part of the connection means, in a third embodiment form in which two first holes and two second holes are present and the body has an elongated shape in the central area;

the FIG. 5d illustrates a top view of a connector according to the invention, part of the connection means, in a fourth embodiment form in which two first holes and a second hole are present and the body presents two central elongation zones;

the FIG. 6a is a detail view of the coupling of two profiles of a modular structure according to the invention in which the instruction element is visibly counter-shaped to the housing and has specific safety tolerances;

the FIG. 6b shows a detail view of the coupling of FIG. 6a in which it is evident that, even when the obstruction element is abutting the core, the connector cannot slip out by virtue of the characteristic tolerances;

the FIG. 7 shows a perspective view of a further example of a connector according to the invention in which the obstruction element is in one piece with the body;

the FIG. 8a illustrates a cross-sectional surface view of an example of a profile according to the invention;

the FIG. 8b is a cross-sectional view of the surface in normal section of a further example of a profile according to the invention; and the FIG. 8c is a cross-sectional view of the surface in normal section of a further example of a profile according to the invention. In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

With reference to the Figures, the modular structure according to the invention is globally referred to as 1.

The modular structure 1 is substantially a frame made with at least one profile 2 and connection means 3. Preferably, structure 1 includes a plurality of profiles 2, although it could also include only one profile 2 constrained to any profiles known to the state of the current technique.

The connection means 3 are substantially capable of allowing each two adjacent two profiles or a profile 2 adjacent to a profile known to the state of the current technique.

Each profile 2 preferably defines a normal section surface 2b.

The normal section surface 2b is therefore preferably the area described by the profile 2. The profile 2 is, essentially, a beam having a prevailing development axis 2a and whose normal sections to the prevailing development axis 2a identify the profile itself or, in particular, the normal section surface 2b.

The main development axis 2a may be straight or curvilinear and may correspond to the barycentric and/or principal axis of inertia.

Basically, the profile 2 makes the beam when extruded along its prevailing development axis 2a. Of course, the term "extruded" means that the profile of the profile 2 is geometrically extruded, i.e. it is a profile, and the term extrusion does not refer to the type of processing. As is well known, Profiles 2 of this type are, however, commonly obtained as extruded profiles by industrial extrusion methods or also by other methods such as, for example, pultrusion or others.

The profile 2 can define, along the plane of the normal section surface 2b, different shapes and dimensions.

The profile 2 may have a substantially conventional or even particular shape.

For example, the profile 2 may define a shape as shown in FIGS. 8a-8c. Or, again, profile 2 may have a shape as described in patent application WO2020144523A1, incorporated herein by reference, in paras [0053-0096] and shown in FIG. 1, or as described in the same application in paras [0097-0122] and shown in FIGS. 2-8. Or, profile 2 may have a shape as described in patent application U.S. Pat. No. 9,797,426, incorporated herein by reference, in paras [0052-0054] and shown in FIGS. 1-3.

Or even, profile 2 may have a shape as described in patent application DE-A-102008006439, incorporated herein by reference, in par. [0035] and shown in FIGS. 1-1a.

In any case, in brief, the profile 2 preferably comprises at least one perimeter wall 20. The perimeter wall 20 preferably extends parallel to the prevailing development axis 2a.

The perimeter wall 20 may, moreover, be substantially a portion of the profile 2 extending around the prevailing development axis 2a and along the prevailing development axis 2a.

The perimeter wall 20 may, therefore, define a flat or even curved surface including possible edges.

Essentially, the perimeter wall 20 may be part of a peripheral element 21.

The peripheral element 21 is substantially a portion of the profile 2 that radially delimits, with respect to the prevailing development axis 2a, the profile 2 itself. Therefore, the peripheral element 21 is substantially an almost tubular portion, or approximate as a tubular element, of the profile 2.

Naturally, the peripheral element 21 may be realised by a single continuous perimeter wall 20, or by a plurality of perimeter walls 20 separated from each other or, again, by one or more perimeter walls 20.

For example, FIGS. 8a and 8c show a profile 2 in which the peripheral element 21 describes, in cross-section, a square shape which is therefore realised by four perimeter walls 20.

For example, in the FIGS. 8a and 8c a profile 2 is shown in which the peripheral element 21 describes, in section, a square shape which is therefore made by four perimeter walls 20.

In each case, advantageously, the profile 2 comprises at least one groove 22. Even more in detail, at least one perimeter wall 20 includes a groove 22.

For example, in the profiles of FIGS. 8a and 8c, each of the perimeter walls 20 includes a groove 22. In the example of FIG. 8b, four of the eight perimeter walls 20 include a groove 22.

In the example of FIG. 4a, only one perimeter wall 20 includes a groove 22.

The groove 22 preferably also extends parallel to the prevailing development axis 2a. This means that the groove 22 does not necessarily extend along the whole of the perimeter wall 20 on which it lies, but may also extend only along part of it, for example at the ends defined by the perimeter wall 20, i.e. by the profile 2, with respect to the prevailing development axis 2a.

Furthermore, the groove 22 is delimited by edges 20a.

Therefore, if the perimeter wall 20 includes a groove 22, then it also includes at least two edges 20a. The edges 20a are, therefore, arranged on opposite sides, i.e. they are mutually facing and oriented towards each other.

Advantageously, at least one of the edges 20a is at least partially indented.

By this is meant that it is not necessarily that the entire edge 20a is indented, but that even only a part of it is indented.

Naturally, both edges 20a could also be, at least partly, jagged.

Furthermore, an edge 20a or both edges 20a may be entirely or completely jagged.

By the term jagged, it is meant that the edges define surfaces facing each other that are frequently interrupted by protrusions and indentations or that have surface dissimilarities.

The indentation of at least one edge 20a therefore allows to block along the axis of prevalent development 2a at least one component introduced inside the groove and presenting a form substantially counter-shaped to the groove.

Said component is, as better explained later, part of the connection means.

In detail, the indented edge 20a may define a plurality of teeth 23.

The teeth 23 are substantially protruding elements from the perimeter wall 20 towards the groove 22. Therefore, the teeth 23 extend from one edge 20a towards the other between the edges 20a.

The teeth 23 may, therefore, each be of a different nature and size. Or, preferably, the teeth 23 may all be identical to each other.

In addition, the teeth 23 may be evenly distributed along the prevailing development axis 2a.

Therefore, if evenly and uniformly distributed, they define a mutual distance d between each adjacent tooth 23.

The distance d may, moreover, be determined in relation to certain characteristic quantities of the profile 2.

In general, the profile 2 defines a main nominal dimension D. The main nominal dimension D is substantially, preferably, the dimension of the square of smaller dimensions circumscribed by the normal section surface 2b of the profile 2.

For example, for the profiles 2 of FIGS. 8a and 8c, the main nominal dimension D corresponds to a side of the square defined substantially by the normal section surface 2b. For Profile 2 of FIG. 8b, the main nominal dimension D corresponds to one side of the square circumscribed by the normal section surface 2b. For a profile 2 having substantially round normal section surface 2b, the main nominal dimension D may correspond with the diameter described by the normal section surface 2b.

For a profile 2 as, for example, described in patent application WO2020144523A1, incorporated herein by reference, in paras [0097-0122] and shown in FIGS. 2-8, the nominal principal dimension D may correspond to a portion of the normal section surface 2b inscribed in a square.

Advantageously, the distance d may be equal to ⅙ of the main nominal dimension D.

In addition, the profile 2 defines a total length L.

The total length L can advantageously be a multiple of the distance d. Such dimensions, allow to always be able to constrain in an appropriate manner and according to any configuration, the profiles of the structure 1 according to the invention.

Of course, such dimensional constraint solutions are not necessary or mandatory and can be modified to realise the profile 2 according to the invention.

The profile 2 may, moreover, include a core 24 and a plurality of arms 25.

The core 24 is disposed in a central position substantially centred along the barycentric or prevailing development axis 2a of the profile 2 itself. Furthermore, the core 24 preferably extends along the prevailing development axis 2a generally along the entire length of the profile 2. Essentially, therefore, it defines the centre or fulcrum of the profile 2.

The core 24 may have various shapes and sizes. For example, the core 24 may have a regular shape, for example substantially square.

By the term "substantially", referring to geometric shapes, it is meant from here on as well as before, that the shape is not absolutely and precisely made as described, but that it roughly defines a similar shape. This, therefore, does not preclude that the corners may be rounded or that the sides may, for example, have curved, slightly convex or serrated portions.

When the core 24 is square in shape, preferably, the arms 25 are constrained to the core 24 from at least part of the vertices of the square shape. The arms 25 may, therefore, be four in number and bound each to a vertex of the square in such a way as to complete all the vertices.

In general, the arms 25 are preferably arranged radially with respect to the prevailing development axis 2a. Furthermore, preferably, the profile 2 more generally comprises at least two arms 25 so as to connect the core 24 and the perimeter wall 20.

The arms 25, like the core 24, preferably extend along the prevailing development axis 2a.

The core 24 may, therefore, be in one piece with the arms 25, and preferably it is, or it may be separate from them, provided it can be conveniently constrained to them, in such a way that the profile 2 can be easily made.

Thus, the profile 2 preferably also includes a housing 26.

The housing 26 is substantially a hollow portion of the profile 2. Preferably, the housing 26 is bounded by core 24, arms 25 and perimeter wall 20. Therefore, substantially, if the perimeter wall 20 includes the groove 22, the housing 26 is accessible at least from the groove 22.

Furthermore, of course, the housing 26 is also accessible from the free ends of the profile 2.

Also, the housing 26 substantially extends along the prevailing development axis 2a.

The connection means 3 are suitable to bind several profiles 2 of which at least one, as explained above, defining the characteristics described above to realise the modular structure 1.

Essentially, the connection means 3 comprise at least one connector 30.

The connector 30 is essentially a connecting element between profiles.

It preferably comprises at least one body 30a.

The body 30a is substantially a flat element, for example a plate. Further, the connector 30 defines a main axis 3a.

The main axis 3a is the direction along which the body 30a mainly extends. Therefore, the body 30a extends along the main axis 3a.

Furthermore, the body 30a includes some other features. For example, preferably, the body 30a includes at least one first constraint guide 300.

The first constraint guide 300 is a component for allowing an external body to pass through its interior. In particular, the first constraint guide 300 extends transversely, for example perpendicularly, to the main axis 3a.

Furthermore, the first constraint guide 300 is suitable for allowing at least the passage of a first constraint device 301. The first constraint guide 300 may also be adapted to couple with the first constraint device 301, as further specified later.

The first constraint guide 300 may thus, for example, be made from a simple through hole, or even a threaded hole. The first constraint device 301 may, on the other hand, be made from an expandable screw, or also a threaded screw. Or, the first constraint guide 300 and the first constraint device 301 may be reversed. Of course, both the first constraint guide 300 and the first constraint device 301 may be replaced by technically equivalent elements since the branch engineer is familiar with a multitude of different constraint devices and, in any case, the type of first constraint guide 300 and first constraint device 301 is not relevant for the purposes of the present invention.

Thus, the body 30a also defines side walls 302.

The side walls 302 extend alongside the main axis 3a so as to delimit the body 30a transversely to the main axis 3a.

Furthermore, advantageously, the side walls 302 are at least partly indented.

Therefore, they are at least partly having the same characteristics as the edges 20a of the profile 2.

Therefore, the connector 30 is intended to be inserted within the groove 22. Furthermore, the side walls 302, interacting with the edges 20a, block the mutual translation between the connector 30 and the profile 2 along the main axis 3a when the connector 30 is inserted into the groove 22 and the main axis 3a is therefore parallel to the prevailing development axis 2a.

In order to realise the indentation, at least part of the side walls 302 comprises a plurality of protuberances 302a.

Preferably, the protuberances 302a extend transversely with respect to the main axis 3a. Furthermore, they are suitable for being disposed between the teeth 23 in such a way as to couple the connector 30 and the profile 2 solidly along the main axis 3a.

Therefore, it is preferable that protuberances 302a and teeth 23 are counter-shaped to each other and define the same pitch.

Therefore, in general, preferably the indentation of at least one edge 20a is counter-shaped to the indentation of at least part of the side walls 302. Although inessential, the counter-indentation of the indentation allows maximising the stability of the connector 30 disposed in the groove 22.

The connector 30, moreover, preferably also includes an obstruction element 31.

The obstruction element 31 is substantially capable of interacting with part of the profile 2. In detail, the obstruction element 31 is suitable to block the radial movement with respect to the prevailing development axis 2a of the connector 30 with respect to the profile 2.

In this regard, the obstruction element 31 may be presented as an element defining a greater extension with respect to the body 30a so as to define with it at least one abutment or undercut.

Preferably, the obstruction element 31 extends more than the body 30a transversely to the main axis 3a, i.e. with respect to the delimitation made by the side walls 302.

Furthermore, the obstruction element 31 is configured to be trapped within the housing 26 so that the perimeter wall 20 obstructs the radial movement with respect to the prevailing development axis 2a of the connector 30 with respect to the profile 2.

The obstruction element 31 may, therefore, be in one piece with the body 30a, as shown in FIG. 7; or, the obstruction element 31 may be removably bondable to the body 30a.

For example, the obstruction element 31 of this second embodiment may be assimilable to a nut.

Thus, the body 30a may include a second constraint guide 303 suitable for housing at least part of a second constraint device 304 configured to mutually constrain the obstruction element 31 and the connector 30.

The second constraint guide 303 and the second constraint device 304 may have the same characteristics as the first constraint guide 300 and the first constraint device 301.

Therefore, they may be implemented in various ways and the way is not relevant with regard to the inventive spirit of the present invention.

For example, the second constraint device 304 may include a screw having a head adapted to be partially housed in the second constraint guide 303. Thus, the second guide 303 may be defined by a simple countersink on which the head of the second constraint device 304 may lie to mutually engage the obstruction element 31 and the body 30a.

Therefore, preferably, in the preferred embodiment in which body 30a and obstruction element 31 are mutually separated, as in FIGS. 1a-1c, obstruction element 31 may also include grooves.

Preferably, in the preferred, but not exclusive, embodiment, the obstruction element 31 comprises at least a first constraint portion 310 and a second constraint portion 311.

The first constraint portion 310 is preferably adapted to couple with the first constraint device 301. The first constraint portion 310 may therefore, for example, be made from a simple through hole, or preferably from a threaded hole.

In this configuration, substantially, the first constraint device 301 is capable of being constrained to the first constraint portion 310 by passing through the first constraint guide 300.

The second constraint portion 311 is preferably adapted to mate with the second constraint device 304. The second constraint portion 311 may therefore, for example, be made from a simple through hole, or preferably from a threaded hole.

In this configuration, substantially, the second constraint device 304 is capable of being constrained to the second constraint portion 311 by resting at least partially on the second constraint guide 303.

Of course, if the body 30a and the obstruction element 31 are in one piece, as shown in FIG. 7, the second constraint guide 303 and the second constraint portion 311 may not be present. Furthermore, the first constraint guide 300 and the first constraint portion 310 may be substantially at least consecutive or even coincident.

Thus, the modular structure 1 may include at least one profile 2 and connection means 3 that include at least one connector 30.

In order to improve safety during coupling, however making it more difficult to thread the connector 30 into the groove 22 at any height of the profile 2, the obstruction element 31 may be made according to predetermined criteria.

In this respect, the perimeter wall 20 defines a thickness $s_1$. In addition, the body 30a also defines a second thickness $s_2$ equal to or less than the first thickness $s_1$.

The obstruction element 31, therefore, can be made in such a way that it is counter-shaped to the housing 26. Furthermore, advantageously, it defines dimensions such that, when the obstruction element 31 is resting on the core 24 and the arms 25, as shown in FIG. 6b, the distance $s_3$ between the obstruction element 31 and the perimeter wall 20 results in being at least less than the second thickness $s_2$. Even more preferably, but not necessarily, the distance ss between the obstruction element 31 and the perimeter wall 20 results in being equal to or less than half of the second thickness $s_2$. Therefore, if there are failures of, for example, the coupling between the first constraint guide 300 and the first constraint device 301 and/or between the second constraint guide 303 and the second constraint device 304, if the obstruction element 31 is separated from the body 30a, the connector 30 is not thrown into the housing 26, or more hardly thrown into the housing 26, with the risk of leading to significant failures, in a short time, of the structure 1.

The connection means 3 may, moreover, include additional components to complete the mutual constraint between two profiles 2 or between a profile 2 and any profile.

In this sense, as shown in FIGS. 1a-1c, the connection means may comprise a base 32. The base 32 is substantially configured to be constrained to one end of the profile 2 or of any profile.

In this way, a structural bar 10 can be made.

The structural bar 10 is substantially a part of the modular structure 1 and may include, substantially, a profile 2 or any profile and part of the connection means 3, in this case the base 32. The structural bar 10, therefore, is nothing more than an assembly of a profile 2, or any profile, and part of the connection means 3 in such a way that the assembly makes up a beam that is already prepared for coupling with other profiles 2 or other structural bars 10.

In order to allow coupling between base 32 and profile 2, the web 24 may include a constraint hole 24a.

If present, the constraint hole 24a is, as in most profiles of the known technique, preferably disposed at the centre of the profile 2 and, therefore, centred with respect to the prevailing development axis 2a, and extends along the same prevailing development axis 2a.

The constraint hole 24a is, therefore, preferably suitable for allowing constraint with other elements. For example, the constraint hole 24a is, in particular, suitable for allowing the tie of the profile 2 with at least part of the connection means 3, for example the base 32, in such a way as to realise a structural bar 10 as previously explained.

The constraint hole 24a may include internal threaded portions in order to be able to trap at least one screw.

The structure 1 realised by a profile 2 and a structural bar 10, may therefore provide for the constraint of two profiles 2 or of a profile 2 with any profile.

Thus, the base 32 included, in this embodiment, in the connection means 3, can be constrained to a profile 2 or to any profile.

The obstruction element 31 is, therefore, arranged in the slot 26 of another profile 2, the connector 30 is arranged in the groove 22 of the same other profile 2 and constrained to the obstruction element 31. In conclusion, the base 32 is constrained to the connector 30 by means of the first constraint device 301.

As already mentioned, in particular, the base 32 is preferably constrained solidly to the obstruction element 31. In the embodiment of FIGS. 1a-1c in which obstruction element 31 and body 30a are separated, base 32 is constrained by means of first constraint device 301 to first constraint portion 310.

Then, the first constraint device 301 passes through the first constraint guide 300 and couples to the first constraint portion 310 substantially trapping the body 30a of the connector 30 between the base 32 and the obstruction element 31.

In the embodiment of FIG. 7, the base 32 may be simultaneously solidly constrained to body 30a and obstruction element 31 via the first constraint guide 300 coinciding with the first constraint portion 310.

As shown in the examples of FIGS. 2 and 3, further, the connection means 3 may comprise at least one connecting device 33.

The connecting device 33 is substantially configured to mutually constrain two connectors 30. The connecting device 33 may be angular, as in FIG. 2, or plate-shaped and substantially laterally available, as in FIG. 3. Generally speaking, advantageously, the connecting devices allow the realisation of T-shaped, or even L-shaped, constraints which are very robust and stable.

In these embodiments, an obstruction element 31 is arranged in a respective slot 26 of at least two said profiles 2. Then, a connector 30 is arranged in a respective groove 22 of the at least two profiles 2 and is constrained to a respective obstruction element 31.

In conclusion, the connecting device 33 is constrained to the connectors 30 by means of the first constraint device 301.

Also in this case, in particular, the connecting device 33 is preferably constrained integrally to the obstruction element 31. In the embodiment of FIGS. 1a-1c in which obstruction element 31 and body 30a are separated, the connecting device 33 is constrained via the first constraint device 301 to the first constraint portion 310.

Then, the first constraint device 301 passes through the first constraint guide 300 and couples to the first constraint portion 310 substantially trapping the connector body 30a between the connecting device 33 and the obstruction element 31.

In the embodiment of FIG. 7, the connecting device 33 may be simultaneously solidly constrained to body 30a and obstruction element 31 via the first constraint guide 300 coinciding with the first constraint portion 310.

The operation of the modular structure 1 described above in structural terms is substantially similar to the operation of any structure comprising profiles and connection means.

The invention comprises, however, a making process of a modular structure 1. The modular structure 1, of course, comprises at least one profile 2 and connection means 3.

The process, essentially, comprises at least the insertion and coupling steps.

In the insertion step, the connector 30 is inserted into the groove in such a way that the mutual movement between the connector 30 and the profile 2 along the main axis 3a is blocked.

In the insertion step, the connector 30 may be directly laid in the groove 22 from the outside, in case, for example, the body 30a is separated from the obstruction element 31.

Or, if the obstruction element 31 is part of the body 30a, the connector 30 may first be positioned in the housing 26, for example by insertion from the transverse groove, and then subsequently laid down in the groove 22 so that the side walls 302 rest on the edges 20a and, at the same time, the obstruction element 31 rests with the inner part of the perimeter wall 20.

In the coupling step, the connector 30 is coupled to the base 32 or the connecting device 33. For example, the coupling is simply achieved by means of at least a first constraint device 301 and a first constraint guide 300, when the latter coincides with the first constraint portion 310.

Thus, the aforementioned steps are sufficient to realise at least a portion of a modular structure 1.

Of course, the process may include further steps. If the obstruction element 31 is not part of the body 30a, then the procedure may include a further positioning step and a further constraining step.

In the positioning step, the obstruction element 31 is positioned in the housing 26 at the connector 30.

If the obstruction element 31 has limited dimensions, it may be inserted into the housing from the groove 22 and by transverse insertion. Or, if the obstruction element 31 has specific dimensions, as explained above, suitable for increasing safety, i.e. it is counter-shaped to the housing 26 and defines dimensions similar to it with the tolerances described above, it can be inserted into the housing 26 by sliding parallel to the prevailing development axis 2a, starting from the free ends of the profile 2.

Then, in the constraining phase, the connector 30 is constrained solidly to the obstruction element 31.

For example, the coupling is achieved by means of at least a second constraint device 304 locked by the second constraining guide 303 and constrained to the second constraint portion 311.

The modular structure 1 according to the invention achieves important advantages.

In fact, the modular structure, and relative procedure for making said modular structure, make it possible to facilitate and speed up the connection of the profiles for making the structural frame.

In addition, a modular structure and a making process of said modular structure, which allows the realisation of various types of connections with the same interface element, defined by the connector 30.

In addition, the connection means allow arranging the obstruction element 31, defining for example a connection nut, with simplicity and without the need to previously insert the same within the side gaps from one end. Or, if the obstruction element 31 is not insertable from the groove 22, it still has the advantage of making the structure 1 extremely safe, avoiding or reducing the possibility of sudden and catastrophic failure. In addition, the indentation of the edge(s) 20a is preferably configured to allow the first constraint device 301 to be introduced into the groove 22 from the outside without passing through one end of the profile 2. Thus, preferably, the largest portion, in cross-section, of the first constraint device 301, in particular for example the head if the first constraint device 301 is a screw, defines dimensions smaller than the dimensions defined by the groove 22. In other words, the distance between the edges 20a is sufficient to allow the passage of the first constraint device 301, as for example shown in FIGS. 6a-6b.

The invention is susceptible to variations within the scope of the inventive concept defined by the claims.

Within this scope, all details are substitutable by equivalent elements and the materials, shapes and dimensions can be any.

The invention claimed is:

1. A modular structure comprising at least:
   a profile defining a prevailing development axis, comprising at least a perimeter wall extending parallel to said prevailing development axis and including:
      a groove extending along at least part of said perimeter wall parallel to said prevailing development axis, and
      at least two edges arranged on opposite sides and delimiting said groove of which at least part of one of said edges is jagged;
   connection means capable of constraining more than said profiles and comprising at least one connector including:
      a flat body extending along a main axis, including at least a first constraint guide suitable to couple with a first constraint device and defining side walls extending alongside said main axis delimiting said body and at least partly indented so as to block reciprocal translation of said such as to block the mutual translation between said connector and said profile along said main axis, when said connector is inserted in said groove and said main axis is therefore parallel to said prevailing development axis,
      an obstruction element detachably constrainable to said body and capable of interacting with at least part of said profile, for blocking radial movement with respect to said prevailing development axis of said connector with respect to said profile;
   said body including a second constraint guide suitable to house at least part of a second constraint device configured to mutually constrain said obstruction element and said connector,
   wherein said obstruction element comprises at least a first constraint portion coupling to said first constraint device and a second constraint portion coupling to said second constraint device, and
   wherein said second constraint is capable of being constrained to said second constraint portion by resting at least partially on said second constraint guide.

2. The modular structure according to claim 1, wherein said constraint device includes a screw having a head, said second guide is defined by a countersink on which said head is apt to be accommodated and said second constraint portion is made by a threaded hole.

3. The modular structure according to claim 1, wherein said at least one indented edge defines a plurality of teeth extending from one of said edges towards the other of said edges.

4. The modular structure according to claim 3, wherein said teeth are uniformly distributed along said prevailing development axis and define a first reciprocal distance (d) between each of said adjacent teeth.

5. The modular structure according to claim 4, defining a total length (L) and comprising a normal section surface perpendicular to said prevailing development axis and defining at least one main nominal dimension, wherein said distance (d) is equal to ⅙ of said main nominal dimension (D) and said total length (L) is a multiple of said distance (d).

6. The modular structure according to claim 1, comprising a core centred with respect to said prevailing development axis and extending along said prevailing development axis, at least a pair of arms arranged radially with respect to said prevailing development axis so as to connect said core and said perimeter wall and extending along said prevailing development axis, and a housing delimited by said core, said arms and said perimeter wall and extending along said prevailing development axis.

7. The modular structure according to claim 3, wherein at least part of said side walls comprises a plurality of protuberances extending transversely with respect to said main axis and capable of being disposed between said teeth to couple said connector and said profile solidly along said main axis.

8. The modular structure according to claim 3, wherein said obstruction element is configured to be trapped within said housing so that said perimeter wall obstructs radial movement with respect to said prevailing development axis of said connector with respect to said profile.

9. The modular structure according to claim 8, wherein said perimeter wall defines a thickness ($s_1$), said housing also defines a second thickness ($s_2$) equal to or less than said first thickness ($s_1$) and said obstruction element is counter-shaped to said housing and defines dimensions such that, when said obstruction element rests on said core and said arms, the distance between said obstruction element and said perimeter wall is at least less than said second thickness ($s_2$).

10. The modular structure according to claim 8, wherein said connection means comprise a base configured to be constrained to one end of said profile or of any profile so as to make a structural bar, said obstruction element is disposed in said housing of another said profile, said connector is disposed in said groove of said other profile and constrained to said obstruction element, and said base is constrained to said connector by means of said first constraint device.

11. The modular structure according to claim 8, wherein said connection means comprise a connecting device configured to mutually constrain at least two of said connectors, a said obstruction element is disposed in a respective said housing of at least two of said profiles, a said connector is arranged in a respective said groove of said at least two profiles and constrained to a respective said obstruction element, and said connecting device is constrained to said connectors by means of said first constraint device.

12. A process for making a modular structure according to claim 10, comprising:
    inserting said connector within said groove, so as to block at least the reciprocal movement between said connector and said profile along said main axis,
    coupling said connector to said base or to said connecting device.

13. The process for making the modular structure according to claim 12, comprising:
    positioning said obstruction element within said housing at said connector,
    constraining said connector to said obstruction element,
    wherein said obstruction element is configured to be trapped within said housing so that said perimeter wall obstructs radial movement with respect to said prevailing development axis of said connector with respect to said profile.

14. The process for making the modular structure according to claim 12, comprising:
    positioning said obstruction element within said housing at said connector,
    constraining said connector to said obstruction element,
    wherein said perimeter wall defines a thickness ($s_1$), said housing also defines a second thickness ($s_2$) equal to or less than said first thickness ($s_1$) and said obstruction element is counter-shaped to said housing and defines dimensions such that, when said obstruction element rests on said core and said arms, the distance ($s_3$) between said obstruction element and said perimeter wall is at least less than said second thickness ($s_2$).

15. The process for making the modular structure according to claim 12, comprising:
    positioning said obstruction element within said housing at said connector,
    constraining said connector to said obstruction element,
    wherein said connection means comprise a base configured to be constrained to one end of said profile or of any profile so as to make a structural bar, said obstruction element is disposed in said housing of another said profile, said connector is disposed in said groove of said other profile and constrained to said obstruction element, and said base is constrained to said connector by means of said first constraint device.

* * * * *